US010692498B2

(12) United States Patent
Andersen et al.

(10) Patent No.: US 10,692,498 B2
(45) Date of Patent: Jun. 23, 2020

(54) QUESTION URGENCY IN QA SYSTEM WITH VISUAL REPRESENTATION IN THREE DIMENSIONAL SPACE (71) Applicant: International Business Machines Corporation, Armonk, NY (US)

(72) Inventors: John J. Andersen, Austin, TX (US); Dogukan Erenel, Round Rock, TX (US); Richard O. Lyle, Cedar Park, TX (US); Ajiemar D. Santiago, Volente, TX (US); Wilson L. Wu, Arcadia, CA (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 15/790,511

(22) Filed: Oct. 23, 2017

(65) Prior Publication Data

US 2019/0122667 A1    Apr. 25, 2019

(51) Int. Cl.
*G10L 15/26* (2006.01)
*G06K 9/00* (2006.01)
(Continued)

(52) U.S. Cl.
CPC ........ *G10L 15/265* (2013.01); *G06F 16/3329* (2019.01); *G06F 40/30* (2020.01); *G06K 9/00302* (2013.01); *G06T 13/40* (2013.01); *G10L 15/14* (2013.01); *G06F 17/00* (2013.01); *G10L 15/26* (2013.01); *G10L 25/63* (2013.01)

(58) Field of Classification Search
CPC ....... G06F 17/3053; G06F 17/00; G10L 15/26
See application file for complete search history.

(56) References Cited

U.S. PATENT DOCUMENTS 6,285,380 B1   9/2001  Perlin et al.
7,725,419 B2   5/2010  Lee et al.
(Continued)

FOREIGN PATENT DOCUMENTS

EP      2207164 A3 * 12/2010  ............. G10L 15/28

OTHER PUBLICATIONS

Setlur et al., "Eviza: A Natural Language Interface for Visual Analysis," UIST 2016, ACM, 29th ACM User Interface Software and Technology Symposium, Tokyo, Japan, Oct. 2016, 13 pages.
(Continued)

*Primary Examiner* — Feng-Tzer Tzeng
(74) *Attorney, Agent, or Firm* — VanLeeuwen & VanLeeuwen; Ingrid M. Foerster (57) ABSTRACT An approach is provided that identifies a current mood state of a requestor from whom a question has been submitted to a question answering (QA) system. The approach determines, based on the identified mood state, an urgency associated with the requestor. Data pertaining to a number of candidate answers is analyzed with the candidate answers being generated by the QA system. The analysis results in an urgency characteristic that pertains to each of the candidate answers. Scoring of the candidate answers is adjusted based on a comparison of the requestor's urgency and the urgency characteristic associated with the candidate answers. Answers are selected from the candidate answers and returned to the requestor with the selected answers based on the adjusted scoring.

8 Claims, 6 Drawing Sheets (51) Int. Cl.
G06T 13/40 (2011.01)
G10L 15/14 (2006.01)
G06F 16/332 (2019.01)
G06F 40/30 (2020.01)
G10L 25/63 (2013.01)
G06F 17/00 (2019.01)

(56) References Cited

U.S. PATENT DOCUMENTS

| | | | |
|---|---|---|---|
| 7,908,554 B1* | 3/2011 | Blattner | G06Q 10/107 |
| | | | 715/706 |
| 7,987,151 B2 | 7/2011 | Schott et al. | |
| 8,214,214 B2 | 7/2012 | Bennett | |
| 2012/0059787 A1 | 3/2012 | Brown et al. | |
| 2015/0279366 A1 | 10/2015 | Krestnikov et al. | |
| 2016/0104486 A1* | 4/2016 | Penilla | G10L 17/06 |
| | | | 704/232 |
| 2016/0154799 A1 | 6/2016 | Allen et al. | |
| 2016/0154889 A1* | 6/2016 | Allen | G06F 16/9535 |
| | | | 707/728 |

OTHER PUBLICATIONS

Gobron et al., "From Sentence to Emotion: A Real-Time Three-Dimensional Graphics Metaphor of Emotions Extracted from Text," Vis Comput (2010) 26: 505-519, Springer-Verlag 2010.

* cited by examiner

QUESTION URGENCY IN QA SYSTEM WITH VISUAL REPRESENTATION IN THREE DIMENSIONAL SPACE

BACKGROUND

With the increased usage of computing networks, such as the Internet, people are inundated with the amount of structured and unstructured information available from various sources. Information gaps abound as users search for information on various subjects and try to piece together what they find and what they believe to be relevant. To assist with such searches, knowledge management systems have been developed which take an input, analyze it, and return results indicative of the most probable results to the input. These question answering (QA) systems provide automated mechanisms for searching through a knowledge base with numerous sources of content, e.g., electronic documents, and analyze them to determine a result and a confidence measure as to how accurate the result is in relation to the input.

QA systems are built on technology used for hypothesis generation, massive evidence gathering, analysis, and scoring. The QA system takes an input question, analyzes it, decomposes the question into constituent parts, generates one or more hypothesis based on both the decomposed question and the results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure. One challenge of QA systems is understanding current state of the user to determine whether a brief or detailed answer is desired.

BRIEF SUMMARY

According to one embodiment of the present disclosure, an approach is provided that identifies a current mood state of a requestor from whom a question has been submitted to a question answering (QA) system. The approach determines, based on the identified mood state, an urgency associated with the requestor. Data pertaining to a number of candidate answers is analyzed with the candidate answers being generated by the QA system. The analysis results in an urgency characteristic that pertains to each of the candidate answers. Scoring of the candidate answers is adjusted based on a comparison of the requestor's urgency and the urgency characteristic associated with the candidate answers. Answers are selected from the candidate answers and returned to the requestor with the selected answers based on the adjusted scoring.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

Figure 1:
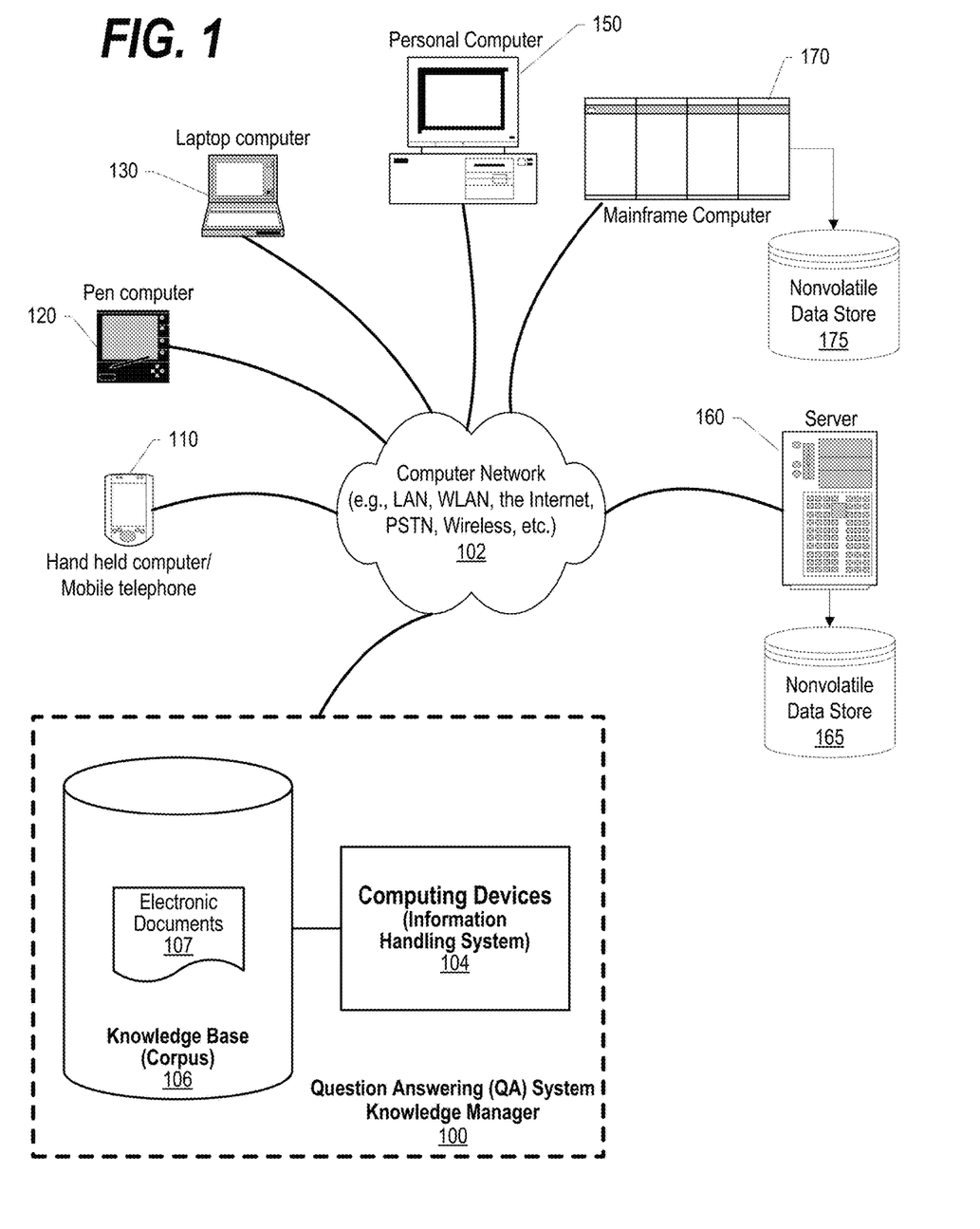
FIG. 1 depicts a schematic diagram of one illustrative embodiment of a question/answer creation (QA) system in a computer network.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
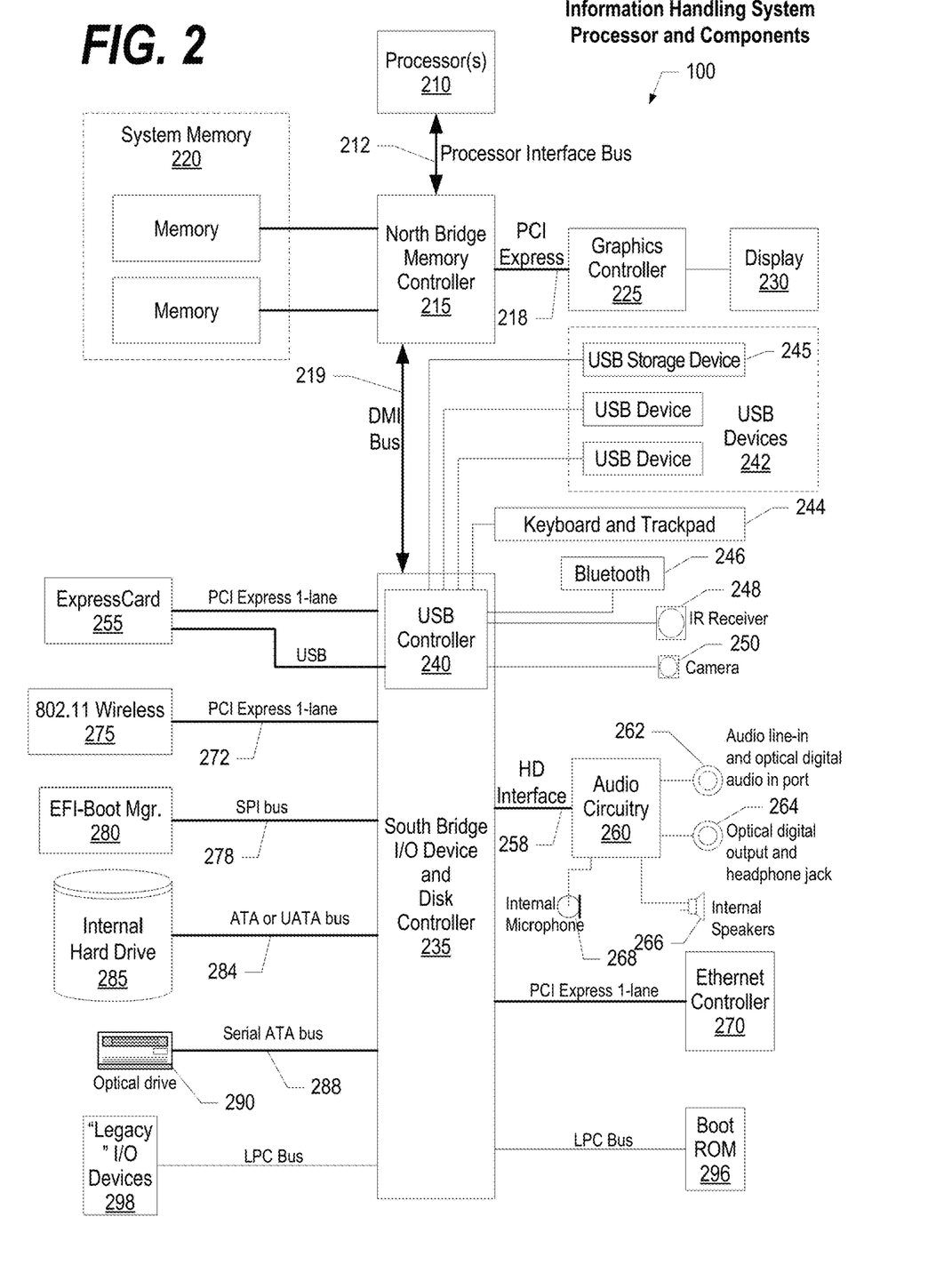
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 4:
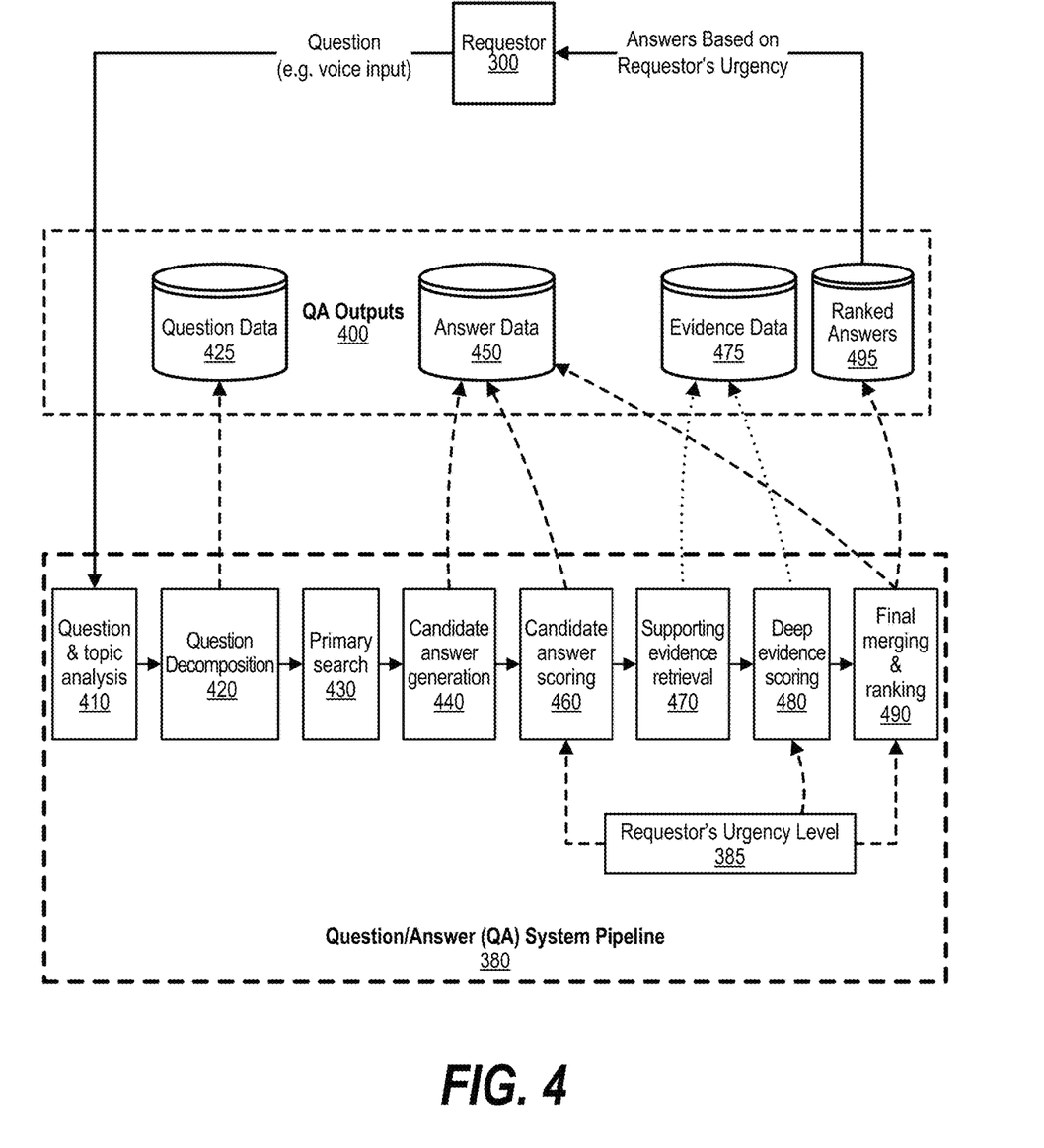
FIG. 4 is an flowchart depicting steps taken by a QA system's pipeline to generate answers based, in part, on the requestor's identified urgency.
Figure 5:
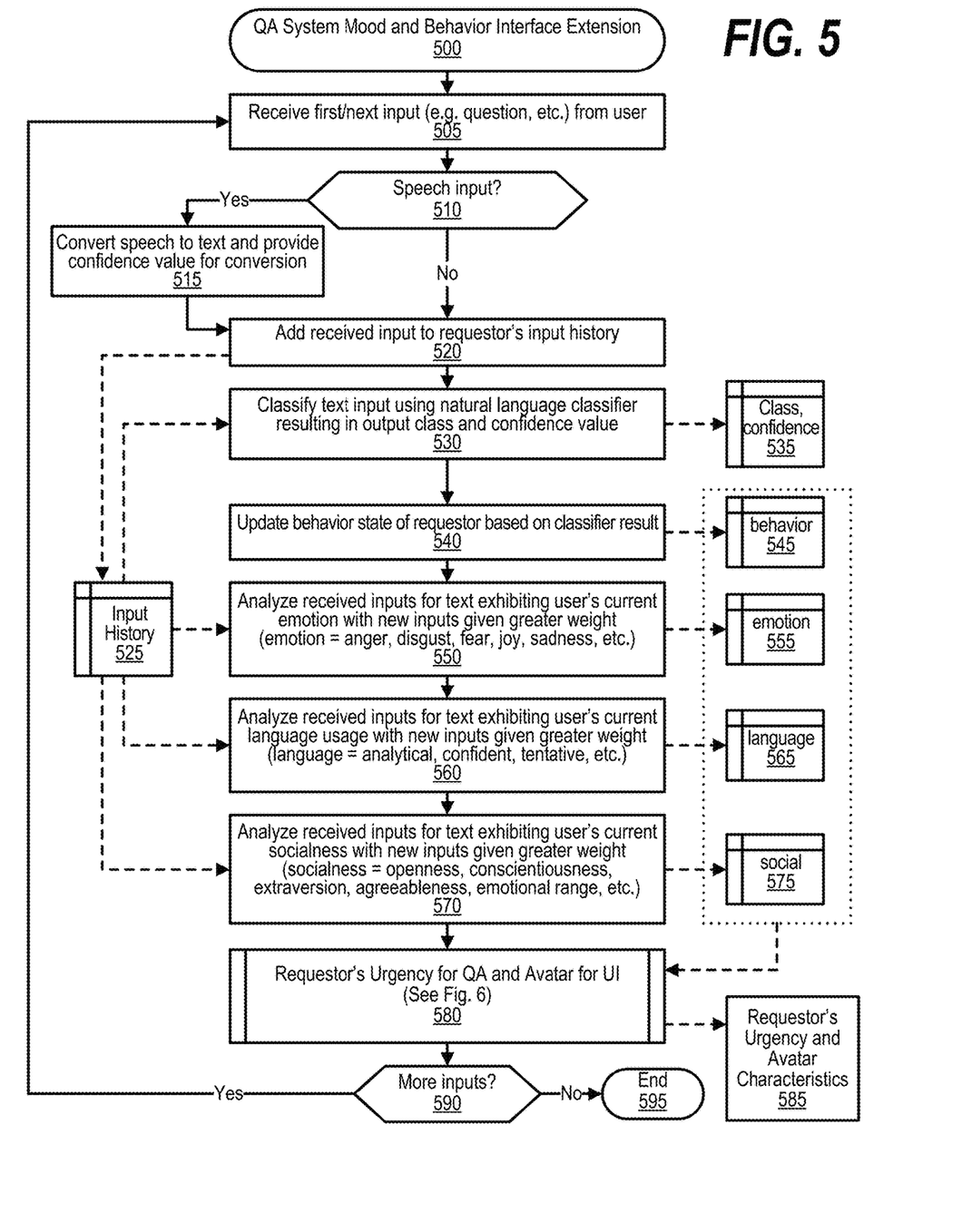
FIG. 5 is an exemplary flowchart depicting steps taken by a QA system to extend the QA services provided to include mood and behavior information.
Figure 6:
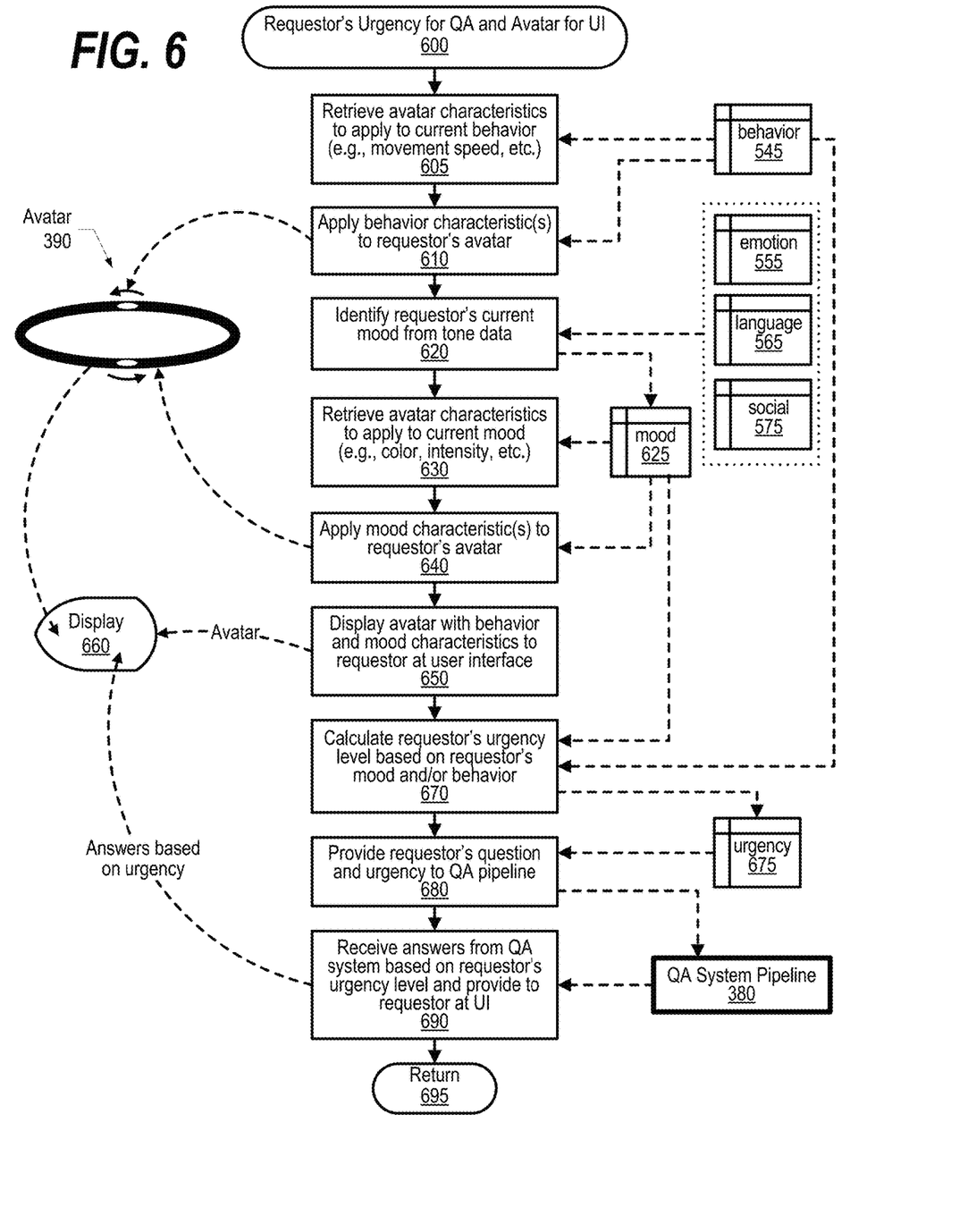
FIG. 6 is an exemplary flowchart depicting steps taken to identify the requestor's urgency and to provide visual characteristics of the avatar that is displayed to the requestor.

FIGS. 4-6 depict an approach that generates an avatar creating a psychological effect of real person communication on interaction with the cognitive avatar used in a question answering (QA) system. Each requestor of the QA system has a corresponding avatar created that provides visual appearance according to his current mood and behavior state. In the virtual three dimensional environment, this can be done via creating a mood and behavior state for the cognitive avatar. Mood can be defined as the current physiological state where as behavior is the current action state of the cognitive avatar. With a visual representation of mood and behavior of a cognitive avatar, certain benefits are obtained. End-users (requestors) have basic understanding of the current QA system state by visually checking a characteristic of the avatar. Enhancement on human-computer interaction is achieved as well as symbolic human like interactions.

The approach includes three output parts: speech-to-text, tone analyzer and natural language classification. After receiving results from a natural language classifier and a tone analyzer, the approach merges the results in order to create a mood or behavior state that is represented by the cognitive avatar. In the Speech-To-Text system the approach receives voice inputs and returns all possible text outputs with final and interim flag and confidence level. The output can be final or interim in order to identify the output text is ready to be processed (final) or it is not finished and still on going process (interim). The confidence level is a value between 0 and 1 (both inclusive) in order to give confidence of text recognition result. In the Tone Analyzer system, the approach receives text as input and returns emotion, language and social values. Emotion is a value that can include Anger, Disgust, Fear, Joy or Sadness. Language is value that can include Analytical, Confident or Tentative. Social is a value that can include Openness, Conscientiousness, Extraversion, Agreeableness or Emotional Range. The Natural Language Classifier system of the approach is trained according to given training data and output classes. Then, The Natural Language Classifier system receives input as text and returns possible class with confidence level. The Mood state of the requestor can be one of the values: Idle, Sleeping, Interested, Urgent, Upset, Shy as well as other moods. The Behavior state can be be Connecting, Sleeping and Listening, Listening, Thinking, Answering, Don't Understand and Error. In one embodiment, the Behavior state reflects the current action, or behavior, of the QA system so that the user, when viewing the avatar, can readily determine the system status.

One embodiment of step by step instruction for mood visual representation of a avatar is given below. First, the requestor is asking question via keyboard input or voice (using speech-to-text). Second, the text input is classified using Natural Language Classifier. Third, according to the classifier result and the confidence level, a change is exhibited in the Behavior state of the avatar. Fourth, the text inputs tone are analyzed by tone Tone Analyzer resulting in values for the requestor's Emotion, Social and Language. Based on the results of the Tone Analyzer, a change is exhibited in the Mood state of the avatar.

Because the approach discovers the mood of the requestor, the requestor's mood, in one embodiment, is used to assist in the selection of answers from the QA system that better match the requestor's current mood. In particular, the urgency of the requestor is utilized to return appropriate responses from the QA system. If the requestor is deemed to be urgent, such as asking how to exit an area due to a fire or other emergency, the appropriate answers from the list of candidate answers will be scored based on those answers that better address the requestor's urgency level. For example, the answers selected from the candidate answers might be selected based on the brevity or simplicity of the answers. In the example discussed, a short answer that quickly conveys an evacuation route would be scored higher than a more lengthy answer that might be included in an extensive site plan or emergency procedures manual.

Figure 3:
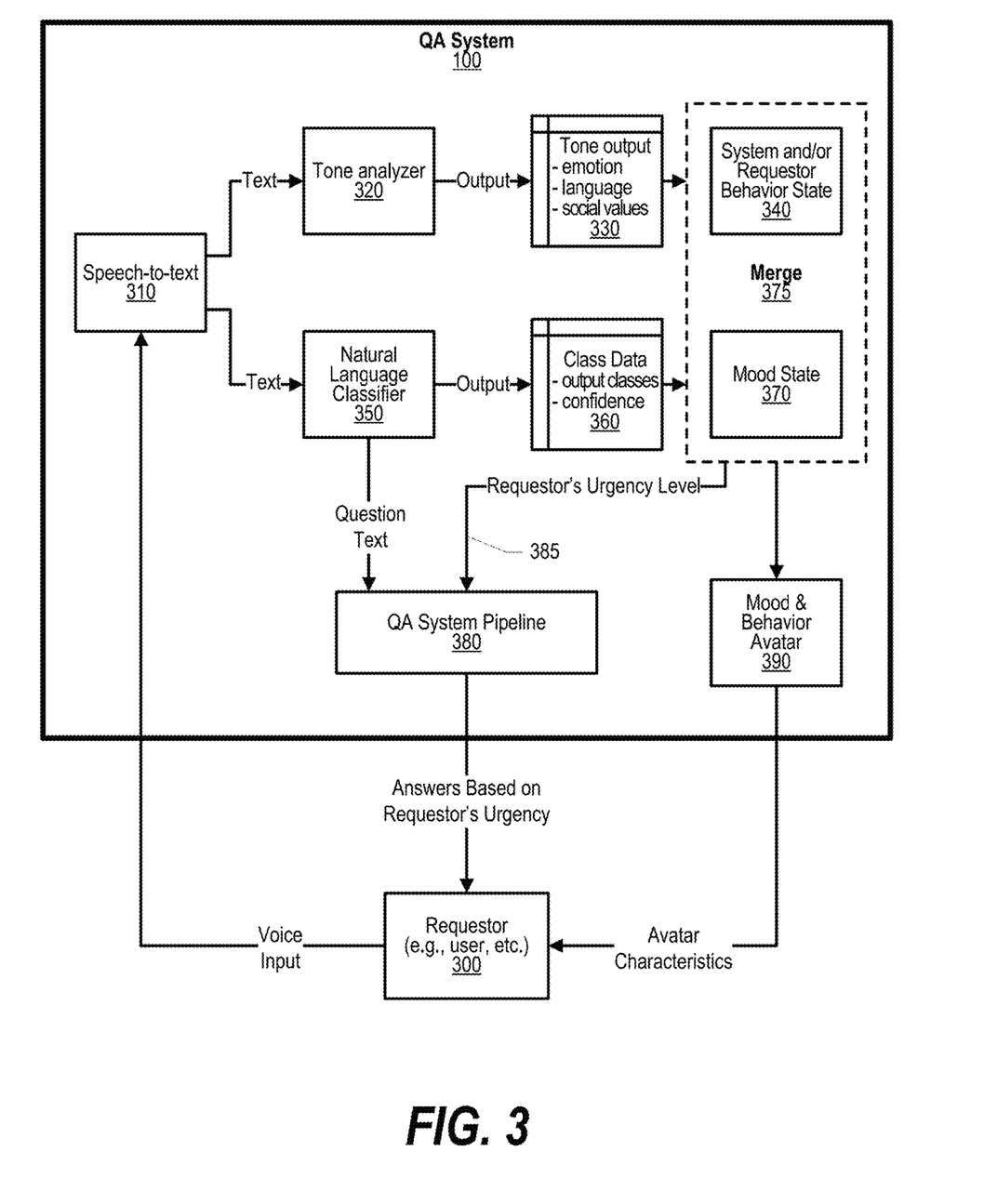
FIG. 3 is a system diagram showing questions being returned to a requestor of a QA system based on urgency of the requestor, along with an avatar depicting mood and behavior information.

FIG. 3 is a system diagram showing questions being returned to a requestor of a QA system based on urgency of the requestor, along with an avatar depicting mood and behavior information. Requestor 300 is a user of question answering (QA) system 100 and utilizes the QA system 100 system via a user interface that provides an avatar that depicts behavior and mood states. In one embodiment, the behavior state is that of QA system 100, such as if the system is listening, idle, busy, or the like. An additional behavior state can include the behavior of the requestor based upon the requestor's detected activity levels, facial expressions, and the like. One or both of these behavior states can be represented in the avatar that is displayed to the user.

Process 310 performs speech-to-text processing on any voice input that was received from requestor 300. The resulting text is passed to processes 320 and 350. Process 320 performs tone analyzer functions on the received text and results in tone output that includes the requestor's detected emotion, language, and social values which are stored in memory area 330. The result of the Tone Analyzer and Natural Language Classifier processes is one or more Behavior States 340 that pertain to QA system 100 (busy, listening, idle, etc.) as well as to the requestor, indicating the requestor's behavior based on the detected actions of the requestor as well as cues, such as facial expressions and the like, detected from digital images taken of the requestor.

Process 350 performs the natural language classifier functions that receive the text of the question from the speech-to-text process and results in class data that includes one or more output classes of the language as well as confidence values pertaining to the output classes. The class data is stored in memory area 360. Another result of the Tone Analyzer and Natural Language Classifier processes is one or more Mood States 370 that pertain to requestor 300. Mood states can include moods of Idle, Sleeping, Interested, Urgent, Upset, Shy as well as other moods.

Merge process 340 and 370 merges the behavior state data and the mood state data into characteristics that are depicted in mood and behavior avatar 390 that is displayed to the requestor. By viewing avatar 390, the requestor readily relates to the QA system's current behavior state (idle, busy, listening, etc.) as well as the system's current understanding of the requestor's mood (e.g., urgent, idle, sleeping, interested, etc.). Merge process 375 also generates urgency level 385 that pertains to the requestor based on the requestor's current mood and, if being analyzed, the requestor's current behavior. This urgency level is fed into QA system pipeline 380, along with the text of the requestor's question, so that the pipeline can answer the question posed by the requestor based, in part, on the urgency level currently experienced by the requestor.

FIG. 4 is an flowchart depicting steps taken by a QA system's pipeline to generate answers based, in part, on the requestor's identified urgency. QA system pipeline 380 shows a pipeline utilized by the QA system with requestor 300 providing questions to the QA system. QA system pipeline 380 includes a number of steps used to process a user's question and return a most likely answer. Step 410 is question and topic analysis which may include identifying whether the user's question is requesting an answer. Step 420 is question decomposition which identifies question keywords (and synonyms) found in the user's question. Data derived by the QA system during question decomposition is stored as question data and stored in data store 425. QA outputs 400 are the various interim and final outputs generated by the QA system pipeline during the different stages of the pipeline process.

Step 430 is a primary search where the QA system searches for possible answers to the user's question with crowd sourced information being included in the primary search. Step 440 is candidate answer generation that generates candidate answers based upon the primary search. Candidate answers are stored in data store 450. Step 460 is candidate answer scoring. Data derived by the QA system during candidate answer generation and scoring is stored as answer data and stored in data store 450. Requestor's urgency level 385 is input to the candidate answer scoring step 460 to adjust the scoring based upon the requestor's urgency level. If the urgency level is high, then long, detailed answers are disfavored (scores adjusted lower), while answers that are brief and to the point are favored (scores adjusted higher). The adjusted candidate answer scores are also stored in data store 450.

Step 470 performs supporting evidence retrieval for each of the candidate answers, and step 480 is deep evidence scoring. In one embodiment, deep evidence scoring also utilizes the requestor's urgency level to adjust the scores of the deep evidence that is being scored. During deep evidence scoring, document ingested by the QA system are used to provide weights to the retrieved supporting evidence. Data derived by the QA system during supporting evidence retrieval and deep evidence scoring is stored as evidence data and stored in data store 475.

Finally, at step 490 final merging and ranking of the supporting evidence and candidate answers takes place. The final ranking results in one of the candidate answers being the "best" ranked candidate answer. This best ranked candidate answer is returned to the user as the most likely answer to the user's question. Data derived by the QA system during final merging and ranking is stored as ranked answer data and stored in data store 495. In one embodiment, final merging and ranking also utilizes the requestor's urgency level to adjust the ranking of answers that match the requestor's urgency level higher than the ranking of answers that do not match the requestor's urgency level.

For example, if the requestor is found to be extremely urgent and two answers are being ranked, one that is brief and concise and another that is longer and detailed, the short, concise answer would be ranked higher as it better matches the requestor's urgency level. The final, ranked answers that are based on the requestor's urgency level are then returned to requestor 300.

FIG. 5 is an exemplary flowchart depicting steps taken by a QA system to extend the QA services provided to include mood and behavior information. FIG. 5 processing commences at 500 and shows the steps taken by a process that QA System Mood and Behavior Interface Extension. At step 505, the process receives the first input (e.g. question, etc.) from the user. The process determines as to whether the user provided speech input or text input to the QA system 100 system (decision 510). If the user provided speech input, then decision 510 branches to the 'yes' branch whereupon at step 515, the process converts speech to text and provide confidence value for conversion. On the other hand, if the user provided text input, then decision 510 branches to the 'no' branch bypassing step 515.

At step 520, the process adds the received input to requestor's input history. The user might be using the QA system over a period of time during which the various inputs are continually added and stored in memory area 525. At step 530, the process classifies the received text input using a natural language classifier. This processing resulting in an output class and a confidence value that are stored in memory area 535.

At step 540, the process updates the behavior state of the requestor based on classifier result. The behavior state of the requestor is stored in memory area 545. In one embodiment, the system further retrieves the current activity, or behavior state, of QA system 100 and this machine state can also be stored in memory area 545. At step 550, the process analyzes the received inputs from the user for text exhibiting the user's current emotion with new inputs given greater weight than older inputs. The emotion can be found to be anger, disgust, fear, joy, sadness, etc. The detected emotion that the user is currently experiencing is stored in memory area 555. At step 560, the process analyzes the received inputs from the for text exhibiting the user's current language usage with newer inputs given greater weight than older inputs. The language use state can be analytical, confident, tentative, etc. The detected language use state corresponding to the user is stored in memory area 565. At step 570, the process analyzes the received inputs from the user for text exhibiting the user's current social quality with newer inputs given greater weight than older inputs. The socialness quality of the user can be openness, conscientiousness, extraversion, agreeableness, emotional range, etc. The language use state can be analytical, confident, tentative, etc. The detected social state corresponding to the user is stored in memory area 575.

At predefined process 580, the process performs the Requestor's Urgency for QA and Avatar for UI routine (see FIG. 6 and corresponding text for processing details). This routine results in an urgency level and various avatar characteristics that are applied to the avatar displayed to the user (585). The process determines whether more inputs are being received from the user (decision 590). When more inputs are being received from the user, then decision 590 branches to the 'yes' branch which loops back to step 505 to receive and process the next input from the user as described above. This looping continues until the user stops using the system, at which point decision 590 branches to the 'no' branch exiting the loop. FIG. 5 processing thereafter ends at 595.

FIG. 6 is an exemplary flowchart depicting steps taken to identify the requestor's urgency and to provide visual characteristics of the avatar that is displayed to the requestor. FIG. 6 processing commences at 600 and shows the steps taken by a process that determines the requestor's urgency for processing by the question answering (QA) system and generates characteristics used in the display of the system avatar displayed in the user interface (UI).

At step 605, the process retrieves the avatar characteristics to apply to current behavior being exhibited by the QA system or by the requestor. The avatar characteristic might be the movement, or speed, of avatar attributes. For example, if the system is idle, the movement might be very slow or stopped, while if the user is busy processing user requests, then the movement and speed of the avatar might be substantially increased to denote the system busy status. At step 610, the process applies the behavior characteristic(s) to the requestor's avatar 390 that is displayed to the user at the UI on display device 660.

At step 620, the process identifies the requestor's current mood from the tone data that was gathered from the user's inputs. The tone data includes emotion data 555, language data 565, and socialness data 575. The result of the analysis of the tone data is mood data that is stored in memory area 625. At step 630, the process retrieves the avatar characteristics to apply to the current mood being exhibited by the requestor. For example, if colors are used to express the mood, then a color such as red might be used to indicate that the requestor is in an urgent mood, while a color such as pink or light blue might be used to indicate that the user is not urgent.

At step 640, the process applies the mood characteristics generated at step 630 to requestor's avatar 390. At step 650, the process displays avatar 390 with the behavior and mood characteristics retrieved from the requestor's input data as well as behavior data collected from QA system 100 as well as the requestor. Avatar 390 is displayed in a user interface that appears on display screen 660 that is viewable by the requestor.

At step 670, the process calculates the requestor's urgency level based on requestor's mood. In one embodiment, the urgency can also be determined from the requestor's current behavior. The urgency that is calculated is stored in memory area 675. At step 680, the process provides the requestor's question and the requestor's urgency level to QA pipeline 380. When answering the user's question, QA pipeline 380 can utilize the urgency level of the requestor to adjust the scoring of candidate answers generated by QA system 100. At step 690, the process receives the answers from QA system with scores adjusted and based, in part, on the requestor's urgency level. The answers received from QA system 100 are displayed to the requestor at the UI displayed on display device 660. FIG. 6 processing thereafter returns to the calling routine (see FIG. 5) at 695.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:

identifying a current mood state of a requestor from whom a question has been submitted to a question answering (QA) system, wherein the current mood state is based on a current emotion of the requestor, a current language usage of the requestor, and a current socialness of the requestor;

determining a current processing state of the QA system selected from the group consisting of an idle state, a busy state, and a listening state;

displaying an avatar to the requestor at a display device accessible by the requestor, wherein the avatar concurrently exhibits both a first visual characteristic and a second visual characteristic, the first visual characteristic indicating the requestor's current mood state and the second visual characteristic indicating to the requestor the current processing state of the QA system; and in response to displaying the avatar to the requestor at the display device that informs the requestor of the current processing state of the QA system:

determining, based on the identified mood state, an urgency associated with the requestor;

analyzing data pertaining to a plurality of candidate answers generated by the QA system, wherein the analysis results in an urgency characteristic pertaining to each of the candidate answers;

adjusting a scoring associated with each of the candidate answers based on a comparison of the requestor's urgency and the urgency characteristic associated with each of the candidate answers; and returning at least one of the candidate answers to the requestor as one or more answers, wherein the answers are selected from the candidate answers based on the adjusted scoring.

2. The method of claim 1 further comprising:

receiving one or more actions received from the requestor;

retrieving a digital facial image of the requestor; and identifying a current behavior state of the requestor in response to evaluating the actions and the retrieved facial image, wherein the evaluating also results in one or more factors that contribute to the analysis that results in the urgency characteristic.

3. The method of claim 2 further comprising:

wherein the avatar includes a third visual characteristic that reflects the requestor's identified current behavior state.

4. An information handling system comprising:

one or more processors;

one or more data stores accessible by at least one of the processors;

a memory coupled to at least one of the processors; and a set of computer program instructions stored in the memory and executed by at least one of the processors in order to perform actions of:

identifying a current mood state of a requestor from whom a question has been submitted to a question answering (QA) system, wherein the current mood state is based on a current emotion of the requestor, a current language usage of the requestor, and a current socialness of the requestor;

determining a current processing state of the QA system selected from the group consisting of an idle state, a busy state, and a listening state;

displaying an avatar to the requestor at a display device accessible by the requestor, wherein the avatar concurrently exhibits both a first visual characteristic and a second visual characteristic, the first visual characteristic indicating the requestor's current mood state and the second visual characteristic indicating to the requestor the current processing state of the QA system; and in response to displaying the avatar to the requestor at the display device that informs the requestor of the current processing state of the QA system:

indicating the current processing state of the QA system;

determining, based on the identified mood state, an urgency associated with the requestor;

analyzing data pertaining to a plurality of candidate answers generated by the QA system, wherein the analysis results in an urgency characteristic pertaining to each of the candidate answers;

adjusting a scoring associated with each of the candidate answers based on a comparison of the requestor's urgency and the urgency characteristic associated with each of the candidate answers; and returning at least one of the candidate answers to the requestor as one or more answers, wherein the answers are selected from the candidate answers based on the adjusted scoring.

5. The information handling system of claim 4 wherein the actions further comprise:

receiving one or more actions received from the requestor;

retrieving a digital facial image of the requestor; and identifying a current behavior state of the requestor in response to evaluating the actions and the retrieved facial image, wherein the evaluating also results in one or more factors that contribute to the analysis that results in the urgency characteristic.

6. The information handling system of claim 5 wherein the actions further comprise:

wherein the avatar includes a third visual characteristic that reflects the requestor's identified current behavior state.

7. A computer program product stored in a computer readable storage medium, comprising computer program code that, when executed by an information handling system, causes the information handling system to perform actions comprising:

identifying a current mood state of a requestor from whom a question has been submitted to a question answering (QA) system, wherein the current mood state is based on a current emotion of the requestor, a current language usage of the requestor, and a current socialness of the requestor;

determining a current processing state of the QA system selected from the group consisting of an idle state, a busy state, and a listening state;

displaying an avatar to the requestor at a display device accessible by the requestor, wherein the avatar concurrently exhibits both a first visual characteristic and a second visual characteristic, the first visual characteristic indicating the requestor's current mood state and the second visual characteristic indicating to the requestor the current processing state of the QA system; and in response to displaying the avatar to the requestor at the display device that informs the requestor of the current processing state of the QA system:
 determining, based on the identified mood state, an urgency associated with the requestor;
 analyzing data pertaining to a plurality of candidate answers generated by the QA system, wherein the analysis results in an urgency characteristic pertaining to each of the candidate answers;
 adjusting a scoring associated with each of the candidate answers based on a comparison of the requestor's urgency and the urgency characteristic associated with each of the candidate answers; and
 returning at least one of the candidate answers to the requestor as one or more answers, wherein the answers are selected from the candidate answers based on the adjusted scoring.

8. The computer program product of claim 7 wherein the actions further comprise:
 receiving one or more actions received from the requestor;
 retrieving a digital facial image of the requestor; and
 identifying a current behavior state of the requestor in response to evaluating the actions and the retrieved facial image, wherein the evaluating also results in one or more factors that contribute to the analysis that results in the urgency characteristic.

\* \* \* \* \*